(12) United States Patent
Hayashi et al.

(10) Patent No.: US 12,450,722 B2
(45) Date of Patent: Oct. 21, 2025

(54) INFORMATION PROCESSING APPARATUS, INFORMATION PROCESSING METHOD, AND RECORDING MEDIUM

(71) Applicant: Kioxia Corporation, Tokyo (JP)

(72) Inventors: Masahiro Hayashi, Tokyo (JP); Shinichiro Manabe, Yokohama Kanagawa (JP); Osamu Torii, Tokyo (JP); Tatsuya Zettsu, Yokohama Kanagawa (JP); Hiroshi Fujita, Yokohama Kanagawa (JP); Ryota Yoshizawa, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 391 days.

(21) Appl. No.: 17/942,752

(22) Filed: Sep. 12, 2022

(65) Prior Publication Data
US 2023/0306582 A1    Sep. 28, 2023

(30) Foreign Application Priority Data

Mar. 22, 2022    (JP) .................................. 2022-045895

(51) Int. Cl.
*G06T 7/00*       (2017.01)
*G01N 21/95*      (2006.01)
(Continued)

(52) U.S. Cl.
CPC ......... *G06T 7/001* (2013.01); *G01N 21/9501* (2013.01); *G06T 3/40* (2013.01);
(Continued)

(58) Field of Classification Search
CPC . G06T 7/001; G06T 2207/30148; G06N 5/01; G06N 20/00
See application file for complete search history.

(56) References Cited

U.S. PATENT DOCUMENTS 11,216,741 B2    1/2022    Takada et al.
11,645,362 B2    5/2023    Nomi et al.
(Continued)

FOREIGN PATENT DOCUMENTS

CN    114139815 A  *  3/2022
JP    H7-93561 A       4/1995
(Continued)

OTHER PUBLICATIONS

Ray, P., Reddy, S.S. & Banerjee, T. Various dimension reduction techniques for high dimensional data analysis: a review. Artif Intell Rev 54, 3473-3515 (2021). https://doi.org/10.1007/s10462-020-09928-0 (Year: 2021).*

(Continued)

*Primary Examiner* — Stephen R Koziol
*Assistant Examiner* — Ashley L. Hytrek
(74) *Attorney, Agent, or Firm* — Finnegan, Henderson, Farabow, Garrett & Dunner, LLP

(57) ABSTRACT

An information processing apparatus has an objective variable acquirer configured to acquire a multi-dimensional objective variable, an objective variable dimension compressor configured to compress the number of dimensions of the objective variable, an explanatory variable acquirer configured to acquire an explanatory variable, and an influence degree calculator configured to set at least one of a basis characterizing the objective variable and a coefficient weighting the basis as a new objective variable and calculate an influence degree on the new objective variable by using the explanatory variable.

27 Claims, 21 Drawing Sheets

1: INFORMATION PROCESSING APPARATUS

(51) Int. Cl.
  *G06T 3/40* (2006.01)
  *G06T 5/70* (2024.01)
(52) U.S. Cl.
  CPC ............ *G06T 5/70* (2024.01); *G06T 2200/24* (2013.01); *G06T 2207/20081* (2013.01); *G06T 2207/30148* (2013.01)

(56) References Cited

U.S. PATENT DOCUMENTS

| | | | |
|---|---|---|---|
| 2017/0315960 A1* | 11/2017 | Ochiai | G06Q 50/04 |
| 2018/0260726 A1* | 9/2018 | Takada | G06F 17/18 |
| 2020/0006100 A1* | 1/2020 | Clark | H01L 21/68707 |
| 2020/0210856 A1 | 7/2020 | Vengalayapalli Kichagari | |
| 2020/0321120 A1 | 10/2020 | Neumann | |
| 2021/0035661 A1 | 2/2021 | Neumann | |
| 2021/0042637 A1 | 2/2021 | Neumann | |
| 2021/0174408 A1 | 6/2021 | Usui | |
| 2021/0263500 A1 | 8/2021 | Jacobs et al. | |
| 2021/0287134 A1* | 9/2021 | Fukushima | G06F 17/18 |
| 2022/0261510 A1 | 8/2022 | Takemoto et al. | |
| 2024/0211457 A1* | 6/2024 | Maeno | G06N 20/00 |

FOREIGN PATENT DOCUMENTS

| | | |
|---|---|---|
| JP | 2011-7553 A | 1/2011 |
| JP | 2012-4181 A | 1/2012 |
| JP | 2020-135066 A | 8/2020 |
| JP | 6740157 B2 | 8/2020 |
| WO | WO 2016/079972 A1 | 5/2016 |
| WO | WO 2021/015134 A1 | 1/2021 |
| WO | WO 2021/133911 A1 | 7/2021 |
| WO | WO 2021/183408 A1 | 9/2021 |

OTHER PUBLICATIONS

Guillaume Obozinski et al., "Multi-task feature selection," Technical Report, Department of Statistics, Univ. of California, Berkeley, 15 pages (2006).

Japan Patent Office, Office Action in JP App. No. 2022-045895 (Jun. 20, 2025).

* cited by examiner

| Index | Objective Variable (Y) | | Explanatory Variable (X) | | | | | |
|---|---|---|---|---|---|---|---|---|
| WAFER_ID | DEFECT RATE [%] | CLASS | PROCESS A_APPARATUS | PROCESS A_CONDITION | PROCESS A_PROCESSING TEMPERATURE [°C] | PROCESS A_PROCESSING GAS PRESSURE [Pa] | PROCESS B_APPARATUS | PROCESS B_CONDITION | PROCESS B_THICKNESS AFTER PROCESSING [nm] |
| 01 | 80 | CONCURRENT | APPARATUS A | CONDITION A | 650 | 1000 | APPARATUS C | CONDITION C | 100 |
| 02 | 0 | NORMAL | APPARATUS B | CONDITION A | 550 | 1010 | APPARATUS C | CONDITION D | 100 |
| 03 | 30 | CENTER | APPARATUS B | CONDITION A | 600 | 1020 | APPARATUS D | CONDITION D | 100 |
| 04 | 50 | RING | APPARATUS A | CONDITION B | 650 | 1020 | APPARATUS D | CONDITION C | 100 |

CATEGORICAL VARIABLE • CONTINUOUS VARIABLE

FIG. 12

| CENTRAL DEFECT | | RING-SHAPED DEFECT | |
|---|---|---|---|
| EXPLANATORY VARIABLE RANKING | REGRESSION COEFFICIENT | EXPLANATORY VARIABLE RANKING | REGRESSION COEFFICIENT |
| PROCESS B_APPARATUS _APPARATUS A | 2.6 | PROCESS E_APPARATUS _APPARATUS B | 3.1 |
| PROCESS A_CONIDTION _CONDITION A | 1.1 | PROCESS A_CONIDTION _CONDITION A | 1.4 |
| PROCESS E_GAS PRESSURE | 0.9 | PROCESS B_PROCESSING TEMPERATURE | 1.0 |
| PROCESS C_APPARATUS _APPARATUS B | 0.4 | PROCESS C_APPARATUS _APPARATUS B | 0.6 |
| PROCESS D_SIZE | 0.2 | PROCESS D_SIZE | 0.1 |

FIG. 13

INFLUENCE DEGREE DISPLAY UNIT

RESULT OF TASK NUMBER 1

| RANKING | VARIABLE | INFLUENCE DEGREE |
|---|---|---|
| 1 | A | 1.6 |
| 2 | B | 1.3 |
| 3 | C | 1.0 |
| 4 | D | 0.5 |
| 5 | E | 0.1 |

RESULT OF TASK NUMBER 2

| RANKING | VARIABLE | INFLUENCE DEGREE |
|---|---|---|
| 1 | D | 1.1 |
| 2 | E | 1.0 |
| 3 | B | 0.9 |
| 4 | A | 0.7 |
| 5 | C | 0.3 |

| INDEX | VALUE |
|---|---|
| R2 | 0.71 |
| MSE | 8.33 |

| SPECIMEN NUMBER | DISEASE RATE [%] | SNP1 | SNP2 | SNP3 | SNP4 | SNP5 | SNP6 | SNP7 |
|---|---|---|---|---|---|---|---|---|
| 01 | 50 | A | A | G | C | A | T | C |
| 02 | 90 | A | T | C | C | T | T | C |
| 03 | 10 | T | T | G | G | T | A | A |

FIG. 15

|        | DIMENSION 1 | DIMENSION 2 | DIMENSION 3 | DIMENSION 4 | DIMENSION 5 | DIMENSION 6 |
|--------|-------------|-------------|-------------|-------------|-------------|-------------|
| TASK 1 | 0.2 | 0.8 | 0.2 | 0.2 | 0.8 | 0.5 |
| TASK 2 | 0.2 | 0.2 | 0.8 | 0.8 | 0.2 | 0.5 |

FIG. 21A

|        | DIMENSION 1 | DIMENSION 2 | DIMENSION 3 | DIMENSION 4 | DIMENSION 5 | DIMENSION 6 |
|--------|-------------|-------------|-------------|-------------|-------------|-------------|
| TASK 1 | 0 | 1 | 0 | 0 | 1 | 1 |
| TASK 2 | 0 | 0 | 1 | 1 | 0 | 1 |

FIG. 21B

|        | DIMENSION 1 | DIMENSION 2 | DIMENSION 3 | DIMENSION 4 | DIMENSION 5 | DIMENSION 6 |
|--------|-------------|-------------|-------------|-------------|-------------|-------------|
| DIRECT PRODUCT GROUP | 00 | 10 | 01 | 01 | 10 | 11 |

FIG. 21C

| ID | DIMENSION 1 | DIMENSION 2 | DIMENSION 3 | DIMENSION 4 | DIMENSION 5 | DIMENSION 6 |
|---|---|---|---|---|---|---|
| 01 | 0.4 | 1.1 | 1.5 | 0.6 | 0.3 | 1.2 |
| 02 | 0.1 | 0.2 | 1.1 | 0.7 | 0.8 | 1.5 |
| 03 | 1.8 | 0.5 | 0.1 | 1.3 | 0.9 | 0.6 |
| DIRECT PRODUCT GROUP | 00 | 10 | 01 | 01 | 10 | 11 |

| ID | 00 | 01 | 10 | 11 |
|---|---|---|---|---|
| 01 | 0.4 | 1.05 | 0.7 | 1.2 |
| 02 | 0.1 | 0.9 | 0.5 | 1.5 |
| 03 | 1.8 | 0.7 | 0.7 | 0.6 | ns
INFORMATION PROCESSING APPARATUS, INFORMATION PROCESSING METHOD, AND RECORDING MEDIUM

CROSS REFERENCE TO RELATED APPLICATIONS

This application is based upon and claims the benefit of priority from the prior Japanese Patent Application No. 2022-45895, filed on Mar. 22, 2022, the entire contents of which are incorporated herein by reference.

FIELD

An embodiment of the present disclosure relates to an information processing apparatus, an information processing method, and a recording medium.

BACKGROUND

Since it is not easy to manually analyze enormous data, a technology for analyzing data using a computer has been proposed. For example, when the presence or absence of a defect of a product is analyzed from an image of the product, a plurality of reference images obtained by photographing a plurality of defect forms in advance are prepared, and an analysis target image can be analyzed by comparing the analysis target image with the reference images.

However, in a case where there are many defect forms, it takes time to specify the form of the defect included in the analysis target image. In addition, in a case where a defect in which a plurality of defect forms are combined, a defect having a form slightly different from that of the reference image, or the like is included in the analysis target image, there is a possibility that appropriate analysis cannot be performed.

BRIEF DESCRIPTION OF THE DRAWINGS

FIG. 8 is a diagram illustrating an example of coefficients and bases obtained by an NMF.

FIG. 11 is a diagram illustrating an example of input data for multitasking Lasso.

FIG. 12 is a diagram illustrating an example of converting a categorical variable into numerical data.

FIG. 13 is a diagram illustrating an example of output data of multitasking Lasso.

FIG. 15 is a diagram illustrating an example in which an information processing apparatus according to a present embodiment is applied to analysis of a relationship between a nucleotide sequence of a gene and a genetic disease.

FIG. 21A illustrates an example of statistic values calculated by the spatial distance calculation unit.

FIG. 21B shows an example of a result of binary conversion of statistic values shown in FIG. 21A, performed by the threshold calculation unit, to express the values as 0 or 1.

FIG. 21C shows an example of direct product group generated for respective dimensions of the objective variable.

DETAILED DESCRIPTION

According to one embodiment, an information processing apparatus has an objective variable acquirer configured to acquire a multi-dimensional objective variable, an objective variable dimension compressor configured to compress the number of dimensions of the objective variable, an explanatory variable acquirer configured to acquire an explanatory variable, and an influence degree calculator configured to set at least one of a basis characterizing the objective variable and a coefficient weighting the basis as a new objective variable and calculate an influence degree on the new objective variable by using the explanatory variable.

Hereinafter, an embodiment of an information processing apparatus, an information processing method, and a recording medium will be described with reference to the drawings. Although main components of the information processing apparatus will be mainly described below, the information processing apparatus may have components and functions that are not illustrated or described. The following description does not exclude components and functions that are not illustrated or described.

First Embodiment

Figure 1:
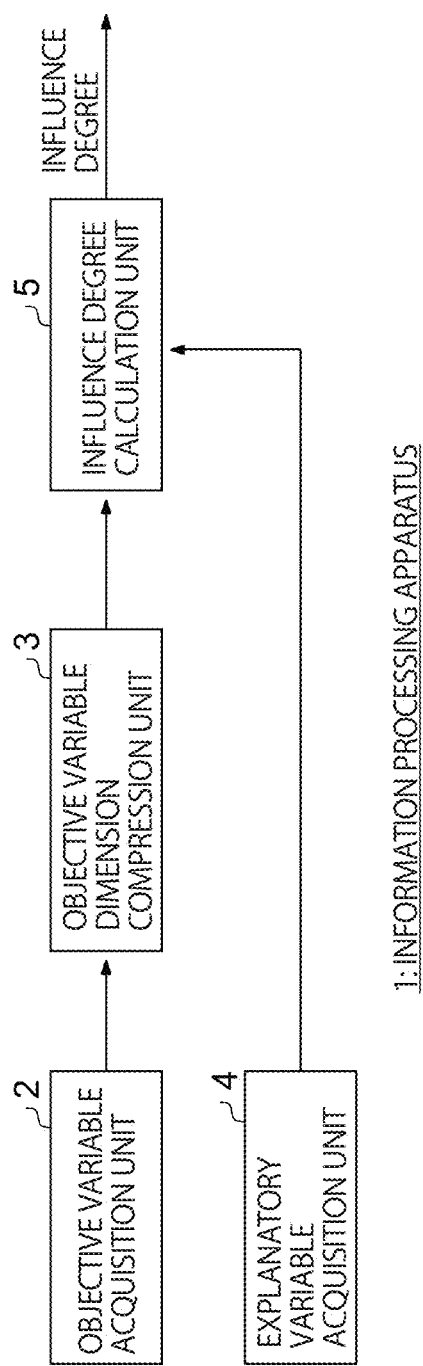
FIG. 1 is a block diagram illustrating a schematic configuration of an information processing apparatus according to a first embodiment.
Figure 2:
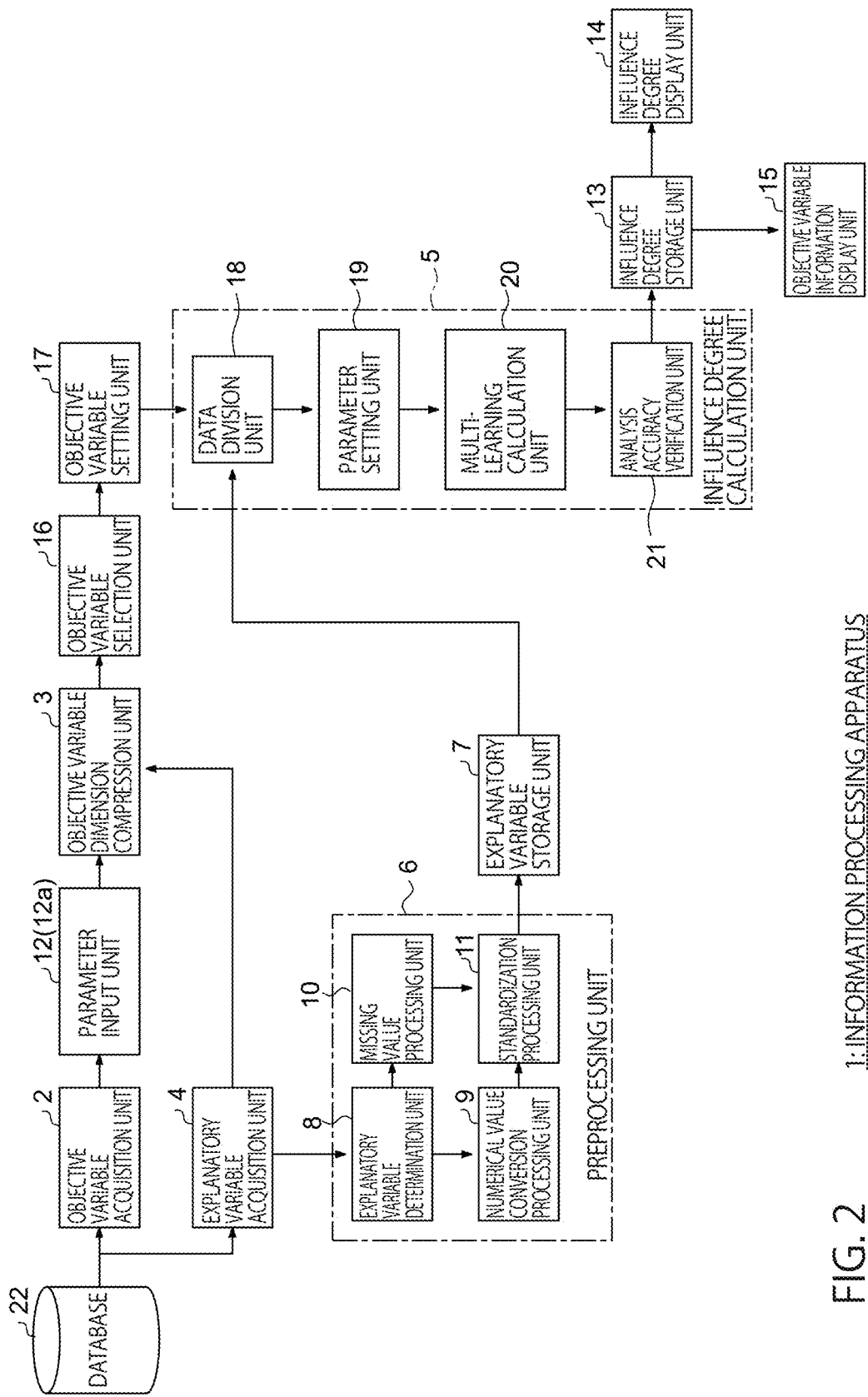
FIG. 2 is a block diagram illustrating a more detailed configuration of an information processing apparatus according to the first embodiment.

FIG. 1 is a block diagram illustrating a schematic configuration of an information processing apparatus 1 according to a first embodiment, and FIG. 2 is a block diagram illustrating a more detailed configuration of the information processing apparatus 1 according to the first embodiment. The information processing apparatus 1 according to the present embodiment includes an objective variable acquisition unit 2, an objective variable dimension compression unit 3, an explanatory variable acquisition unit 4, and an influence degree calculation unit 5. The information processing apparatus 1 of FIG. 1 can perform processing operations of the objective variable acquisition unit 2, the objective variable dimension compression unit 3, and the influence degree calculation unit 5, for example, by a computer executing a program stored in a recording medium. Alternatively, as will be described later, a hardware device that executes at least a partial function of the objective variable acquisition unit 2, the objective variable dimension compression unit 3, and the influence degree calculation unit 5 may be provided.

The objective variable acquisition unit 2 acquires a multi-dimensional objective variable. For example, the objective variable acquisition unit 2 may acquire an objective variable stored in an objective variable storage unit (not illustrated), or may acquire an objective variable input from an objective variable input unit (not illustrated). The objective variable is a continuous variable to be dimensionally compressed. The multi-dimensional objective variable acquired by the objective variable acquisition unit 2 includes, for example, at least one of an electrical characteristic value, a numerical value, and a measured value. In the present specification and claims, the phrase "at least one of A, B and C" means to include only A, or only B, or only C, or an arbitrary combination of two or more among A, B and C.

The objective variable dimension compression unit 3 compresses the number of dimensions of the objective variable acquired by the objective variable acquisition unit 2. By compressing the number of dimensions of the objective variable, a processing load of the information processing apparatus 1 can be reduced, and the objective variable can be easily analyzed. For example, in a case of performing defect analysis, the objective variable is compressed to the number of dimensions highly related to the defect. The objective variable dimension compression unit 3 compresses the number of dimensions of the objective variable by using, for example, a principal component analysis (PCA), a clustering, or a non-negative matrix factorization (NMF).

The explanatory variable acquisition unit 4 acquires an explanatory variable. The explanatory variable is a variable that affects the objective variable, and includes at least one of a continuous variable and a categorical variable. The continuous variable is numerical data, whereas the categorical variable is non-numerical data. The explanatory variable acquisition unit 4 may acquire an explanatory variable input from an explanatory variable input unit (not illustrated), In the present specification and claims, the phrase "at least one of A and B" means to include only A, or only B, or both of A and B.

The influence degree calculation unit 5 sets at least one of a basis characterizing the objective variable and a coefficient weighting the basis as a new objective variable, and calculates an influence degree on the new objective variable using the explanatory variable acquired by the explanatory variable acquisition unit 4. In particular, the influence degree calculation unit 5 according to the first embodiment sets a coefficient obtained by compressing the number of dimensions of the objective variable as a new objective variable, and calculates an influence degree on the new objective variable by using the explanatory variable acquired by the explanatory variable acquisition unit 4. The influence degree is, for example, an influence degree on a defect occurrence when the defect analysis is performed. More specifically, when the influence degree calculation unit 5 uses multitasking Lasso as described later, the influence degree is a regression coefficient.

As illustrated in FIG. 2, the information processing apparatus 1 according to the present embodiment may include a preprocessing unit 6 and an explanatory variable storage unit 7, The preprocessing unit 6 performs preprocessing for converting the explanatory variable acquired by the explanatory variable acquisition unit 4 into a data analyzable format. The explanatory variable storage unit 7 stores the preprocessed explanatory variable.

More specifically, the preprocessing unit 6 may include an explanatory variable determination unit 8, a numerical value conversion processing unit 9, a missing value processing unit 10, and a standardization processing unit 11. The explanatory variable determination unit 8 determines whether the explanatory variable acquired by the explanatory variable acquisition unit 4 is a categorical variable or a continuous variable. When the explanatory variable acquired by the explanatory variable acquisition unit 4 is a categorical variable, the numerical value conversion processing unit 9 performs numerical value conversion processing of the categorical variable. When the explanatory variable acquired by the explanatory variable acquisition unit 4 is a continuous variable, the missing value processing unit 10 performs processing of complementing a missing value. The standardization processing unit 11 performs standardization processing of the explanatory variable subjected to the numerical value conversion processing or the missing value processing. The standardization processing is, for example, processing of normalizing a maximum value as 1. The explanatory variable after the standardization processing is stored in the explanatory variable storage unit 7. The explanatory variable stored in the explanatory variable storage unit 7 is input to the influence degree calculation unit 5.

As illustrated in FIG. 2, the information processing apparatus 1 according to the present embodiment may include a parameter input unit 12. The parameter input unit 12 inputs a parameter necessary for compressing the number of dimensions of the objective variable. For example, in a case where the objective variable includes a plurality of tasks, a parameter designating the number of tasks is input. The parameter input by the parameter input unit 12 is used by the objective variable dimension compression unit 3. The parameter input unit 12 may include a user interface unit 12a having a function of re-inputting the parameter while displaying a compression result of the number of dimensions of the objective variable. The compression result of the number of dimensions of the objective variable is displayed on a screen of the user interface unit 12a. An operator can confirm the compression result of the number of dimensions of the objective variable and reinput the parameter. As a result, the operator can input a parameter that makes the compression result of the number of dimensions of the objective variable good. If no parameter is required to compress the number of dimensions of the objective variable, the parameter input unit 12 may be omitted.

As will be described later, the objective variable can be calculated based on a multiplication result of a basis characterizing the objective variable and a coefficient weighting the basis. The objective variable dimension compression unit 3 can calculate the coefficient and the basis by inputting the objective variable to a formula for calculating the objective variable based on the multiplication result of the basis characterizing the objective variable and the coefficient weighting the basis. The coefficient is used as the objective variable in the influence degree calculation unit 5.

The influence degree calculation unit 5 calculates an influence degree on the objective variable by performing calculation by using, for example, a multi-learning method. More specifically, the influence degree calculation unit 5 may calculate the influence degree on the objective variable by using the multitasking Lasso, Bayesian optimization, or the like. The calculated influence degree is stored in, for example, an influence degree storage unit 13.

As illustrated in FIG. 2, the information processing apparatus 1 according to the present embodiment may include an influence degree display unit 14 and an objective variable information display unit 15.

The influence degree display unit 14 displays each of the explanatory variables and the corresponding influence degree for each of the coefficients obtained by the dimension compression of the objective variable. The influence degree calculation unit calculates a regression coefficient as the influence degree by using, for example, the multitasking Lasso. In this case, the influence degree display unit 14 may rearrange and display each of the explanatory variables in order of values of the regression coefficients. The objective variable information display unit 15 displays information on the objective variable used for the multitasking Lasso.

As illustrated in FIG. 2, the information processing apparatus 1 according to the present embodiment may include an objective variable selection unit 16 and an objective variable setting unit 17. The objective variable selection unit 16 selects an objective variable necessary for the influence degree calculation unit 5 to calculate the influence degree among the objective variables of the number of dimensions compressed by the objective variable dimension compression unit 3. The objective variable setting unit 17 sets the parameter selected by the objective variable selection unit 16 as an objective variable of the compressed number of dimensions.

As illustrated in FIG. 2, the information processing apparatus 1 according to the present embodiment may include a data division unit 18, a parameter setting unit 19, a multi-learning calculation unit 20, and an analysis accuracy verification unit 21.

When the influence degree calculation unit 5 calculates the influence degree, the data division unit 18 generates a data set obtained by combining the explanatory variable read from the explanatory variable storage unit 7 and the objective variable of which the number of dimensions is compressed, and divides the data set into training data and verification data. The parameter setting unit 19 sets a parameter to be used by the multi-learning calculation unit 20. The multi-learning calculation unit 20 performs calculation such as multitasking Lasso, which is a sparse modeling method or Bayesian optimization of multi-objective optimization by using the training data divided by the data division unit 18 and the parameter, and calculates the influence degree such as a regression coefficient. The analysis accuracy verification unit 21 calculates an accuracy of the influence degree calculated by the influence degree calculation unit 5 based on the verification data divided by the data division unit 18.

Figure 3A:
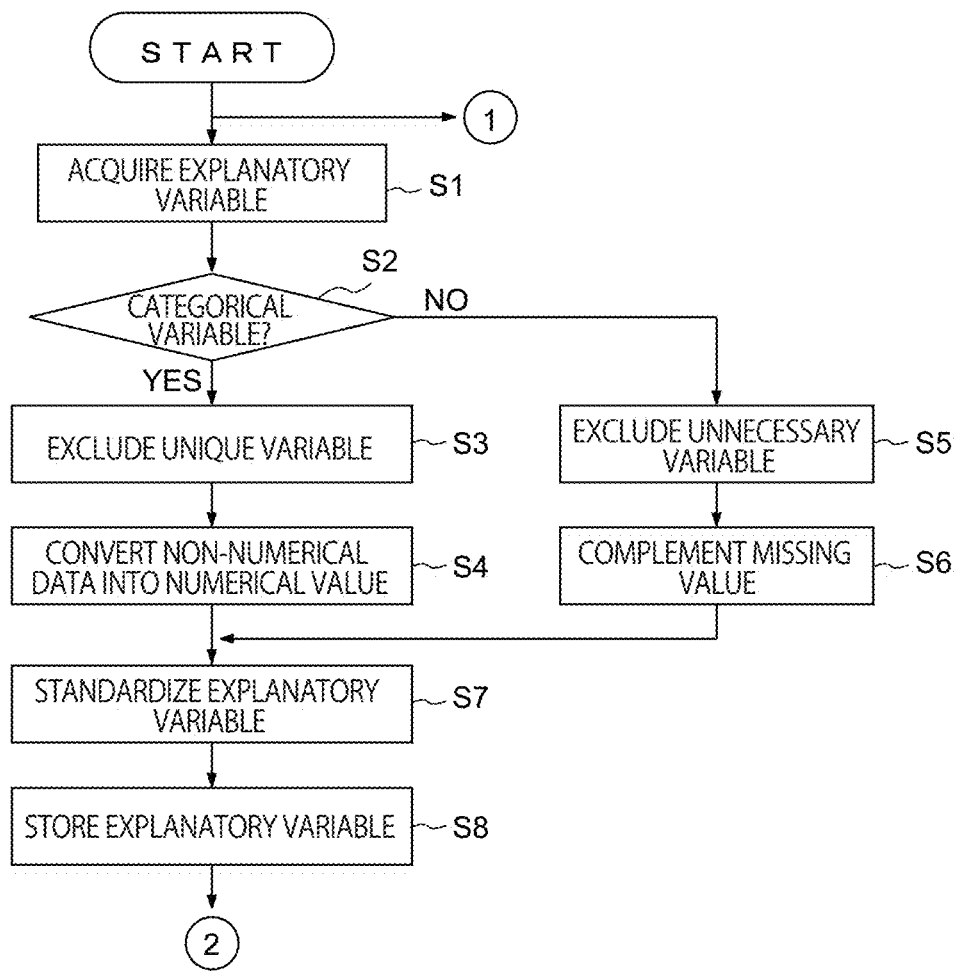
FIG. 3A is a flowchart illustrating a processing operation of an information processing apparatus according to the first embodiment.
Figure 3B:
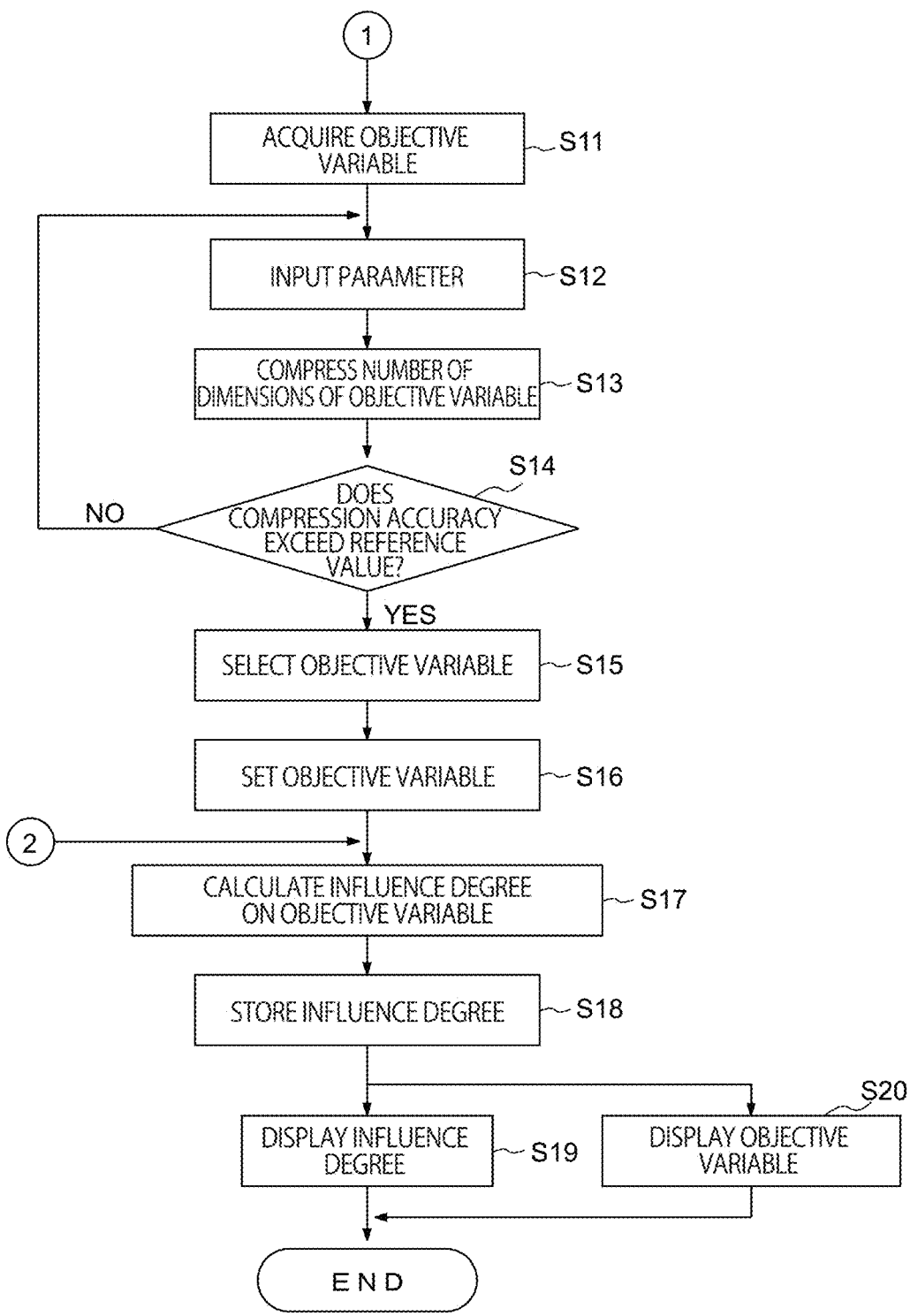
FIG. 3B is a flowchart following FIG. 3A.

FIGS. 3A and 3B are flowcharts Illustrating processing operation of the information processing apparatus 1 according to the present embodiment. Steps S1 to S8 in FIG. 3A indicate the processing operation of the explanatory variable, and steps S11 to S20 in FIG. 3B indicate the processing operation of the objective variable. In parallel with the processing of steps S1 to S8, the processing of steps S11 to S16 is performed, and step S17 and the subsequent steps are performed by using processing results of steps S8 and S16.

First, the explanatory variable acquisition unit 4 acquires an explanatory variable from a database 22 (step S1). Next, the explanatory variable determination unit 8 determines whether the acquired explanatory variable is a categorical variable (step S2).

When YES is determined in step S2, that is, when the explanatory variable is the categorical variable, the numerical value conversion processing unit 9 excludes a unique variable (step S3) and converts non-numerical data into numerical data (step S4).

On the other hand, when NO is determined in step S2, that is, when the explanatory variable is a continuous variable, the missing value processing unit 10 excludes an unnecessary variable (step S5) and complements the missing value (step S6).

When the processing of step S4 or S6 ends, the standardization processing unit 11 standardizes the explanatory variable (step S7), The standardized explanatory variable is stored in the explanatory variable storage unit 7 (step S8).

In parallel with the processing of steps S1 to S8, the objective variable acquisition unit 2 acquires the objective variable from the database 22 (step S11 in FIG. 3B), Next, the parameter input unit 12 inputs a parameter used for processing of the objective variable dimension compression unit 3 (step S12). The input parameter is, for example, the number of dimensions of the objective variable. The parameter input unit 12 inputs the parameter by using the user interface unit 12a.

Next, the objective variable dimension compression unit 3 compresses the number of dimensions of the objective variable by using the objective variable acquired in step S11 and the parameter input in step S12 (step S13). Next, it is determined whether a compression accuracy by the objective variable dimension compression unit 3 exceeds a reference value (step S14). When NO is determined in step S14, that is, when the compression accuracy is lower than the reference value, the processing in steps S12 to S14 is repeated. In the processing of steps S12 to S14, for example, the operator can reinput the parameter while viewing a screen display by using the user interface unit 12a.

When YES is determined in step S14, that is, when the compression accuracy exceeds the reference value, the objective variable selection unit 16 selects a coefficient to be used as a new objective variable by the influence degree calculation unit 5 among coefficients obtained by compressing the number of dimensions of the objective variable (step S15). Next, the objective variable setting unit 17 sets the objective variable selected by the objective variable selection unit 16 as a new objective variable for influence degree calculation (step S16).

Next, the influence degree calculation unit 5 calculates the influence degree on the objective variable based on the objective variable set in step S16 and the explanatory variable stored in the explanatory variable storage unit 7 in step S8 (step S17). As will be described later, the influence degree calculation unit 5 performs calculation by using, for example, a multi-learning method. The influence degree calculated by the influence degree calculation unit 5 is stored, for example, in the influence degree storage unit 13 (step S18).

Next, the influence degree stored in the influence degree storage unit 13 is displayed by the influence degree display unit 14 as necessary (step S19). When necessary, the objective variable information display unit 15 displays the objective variable used to calculate the influence degree (step S20).

Hereinafter, an example of performing defect analysis in a manufacturing process of a semiconductor device by using the information processing apparatus 1 according to the present embodiment will be described. The semiconductor device is manufactured by performing a large number of processes such as film formation, exposure, and etching on a semiconductor wafer. There is a possibility that a defect occurs during the processing of any process, and by analyzing what kind of defect occurs in which process, it is possible to identify a factor of the defect and take measures against the defect, leading to an improvement in yield.

Figure 4:
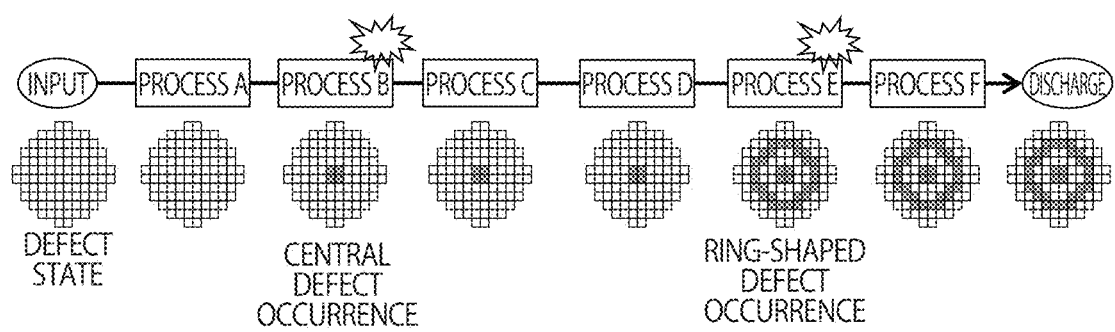
FIG. 4 is a diagram schematically illustrating a state in which a defect occurs in a process of processing a semiconductor wafer in a plurality of processes.

FIG. 4 is a diagram schematically illustrating a state in which a defect occurs in a process of processing a semiconductor wafer in a plurality of processes, FIG. 4 illustrates an example in which a processed semiconductor wafer is discharged through a total of six processes from a process A to a process F with respect to the semiconductor wafer input to a semiconductor manufacturing apparatus. FIG. 4 illustrates an example in which a defect occurs in a central portion of the semiconductor wafer in a B process, and a ring-shaped defect further occurs in a process E.

Figure 5:
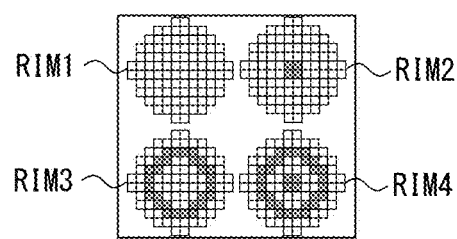
FIG. 5 is a diagram illustrating four types of reference images.

It is assumed that the reference image can be classified into four types of reference images as illustrated in FIG. 5 by visualizing the electrical characteristic value of the semiconductor wafer or some measured value as an objective variable. A reference image RIM1 is an image without a defect, a reference image RIM2 is an image including only a defect in the central portion, a reference image RIM3 is an image including only a ring-shaped defect, and a reference image RIM4 is an image including both the defect in the central portion and the ring-shaped defect. In the four types of reference images illustrated in FIG. 5, a chip having a higher or lower measured value as compared to other chips is expressed by a color or a luminance change, assuming that the chip having the higher or lower measured value is defective.

When the defect analysis of a semiconductor wafer is performed, it is conceivable to detect, by image analysis, which of the reference images RIM1 to RIM4 corresponds to an image obtained by visualizing the electrical characteristic value, the measured value, or the like of the semiconductor wafer to be subjected to the defect analysis as an objective variable. However, the same semiconductor wafer may include defects of a plurality of different forms, and when a combination of a plurality of different defects is taken into consideration when the number of defect forms increases, the number of reference images becomes very large, and it takes a lot of time to classify the image to be subjected to the defect analysis. In addition, when a defect occurrence rate is greatly different for each defect form, a true cause of the defect may not be accurately determined for a defect form having a low defect occurrence rate.

On the other hand, the present embodiment reduces the number of dimensions of the objective variable by performing the processing operation of the flowcharts of FIGS. 3A and 3B, and performs the calculation by the multi-learning method using the coefficient obtained by reducing the number of dimensions of the objective variable as a new objective variable, thereby calculating the influence degree on the new objective variable.

Figures 6, 7:
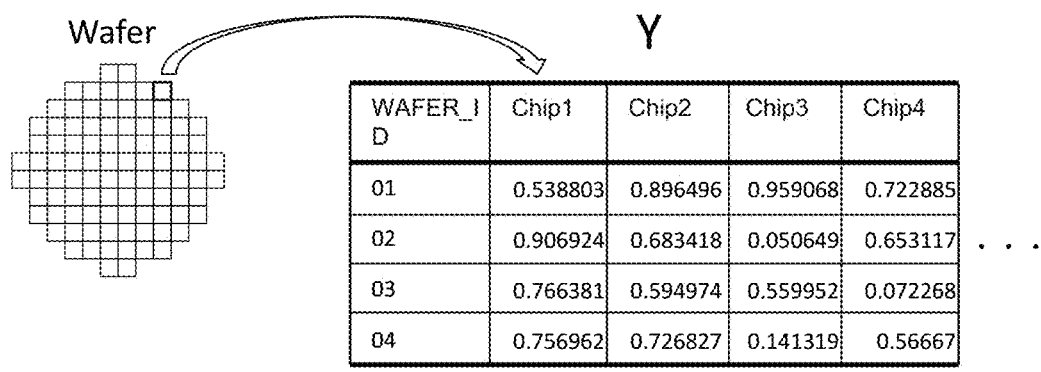
FIG. 6 is a diagram illustrating an example of an objective variable input to an objective variable dimension compression unit.
FIG. 7 is a diagram illustrating an example in which an objective variable is dimensionally compressed into two coefficients and two bases.

FIG. 6 is a diagram illustrating an example of an objective variable Y input to the objective variable dimension compression unit 3. FIG. 6 is a diagram illustrating chip information on the semiconductor wafer. The chip information includes, for example, the electrical characteristic value, the numerical data, the measured value, and the like of each chip. Since a plurality of chips are formed on the semiconductor wafer, an objective variable including the chip information for each of the plurality of chips is input to the objective variable dimension compression unit 3.

The objective variable dimension compression unit 3 compresses the number of dimensions of the objective variable by, for example, the NMF, The NMF is represented by the following Formula (1). Y is an objective variable of a dimensional compression target, W is a coefficient obtained by the dimensional compression, H is a basis obtained by the dimensional compression, and E is an error. For example, Y is represented by a matrix of n rows and d columns, W is represented by a matrix of n rows and m columns, and H is represented by a matrix of m rows and d columns (d, m, and n are integers of 1 or more).

$$Y = W \cdot H + E \qquad (1)$$

FIG. 7 illustrates an example in which the objective variable Y is dimensionally compressed to two coefficients w1 and w2 and two bases h1 and h2, The coefficient w1 is a coefficient multiplied by the basis h1, and is a coefficient for determining a magnitude of the basis h1. The coefficient w2 is a coefficient multiplied by the basis h2, and is a coefficient for determining a magnitude of the basis h2. The bases h1 and h2 are defects of different forms from each other, for example.

Figure 8:
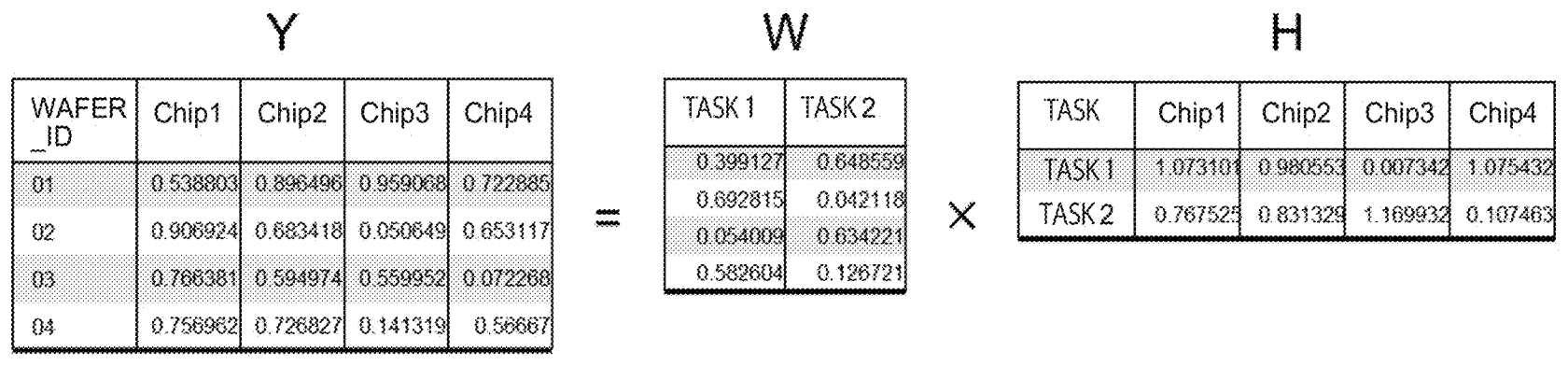

FIG. 8 is a diagram illustrating an example of a coefficient W and a basis H obtained by the NMF when the objective variable of FIG. 6 is input to the objective variable dimension compression unit 3. In the example of FIG. 8, two tasks as bases and the coefficient W corresponding to each task are obtained by the NMF. The task is, for example, a type of defect.

In this manner, by inputting the objective variable Y to the objective variable dimension compression unit 3 and arbitrarily setting a condition such as the number of tasks of the NMF as the parameter, for example, the coefficient W, the basis H, and an error E can be automatically calculated from the objective variable Y under the set condition.

It is necessary to appropriately input the condition such as the number of tasks to the objective variable dimension compression unit 3. When an undesirable condition is input, it is difficult to calculate an appropriate coefficient W, basis H, and error E. The parameter input unit 12 according to the present embodiment enables the operator to arbitrarily input the condition such as the number of tasks to be used in the objective variable dimension compression unit 3 via the user interface unit 12a.

Figure 9:
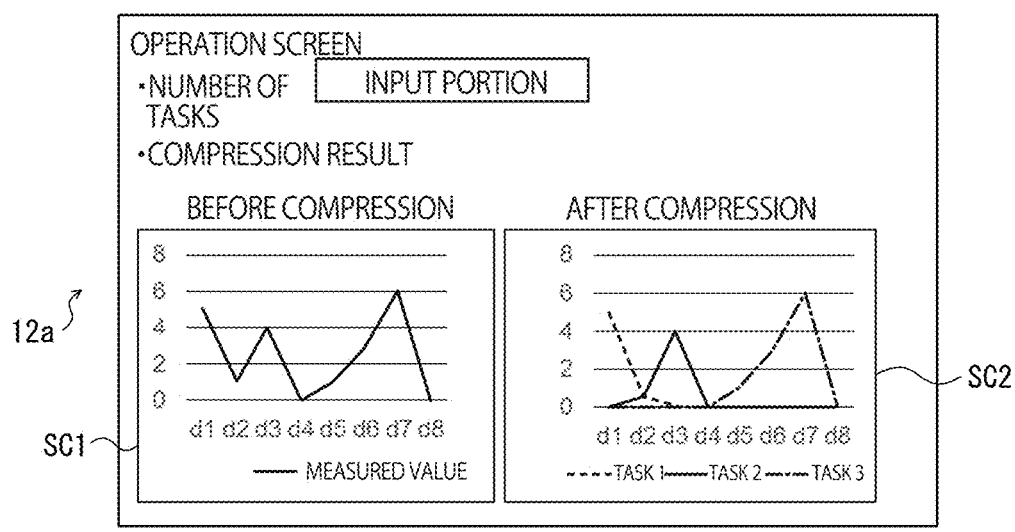
FIG. 9 is a diagram illustrating an example of an operation screen of a user interface unit.

FIG. 9 is a diagram illustrating an example of an operation screen of the user interface unit 12a. A screen SC1 of FIG. 9 illustrates an example in which a value (for example, the electrical characteristic value) of the objective variable before the number of tasks as the objective variable is compressed is displayed as a polygonal line graph, and a screen SC2 illustrates an example in which a value of the objective variable when the number of tasks is compressed to 3 is displayed as a polygonal line graph. A horizontal axis of each of the screens SC1 and SC2 represents a type of a chip, and a vertical axis represents a value of the objective variable. The operator can approximate the polygonal line graph before compression by adjusting the number of tasks via the user interface unit 12a.

Figure 10:
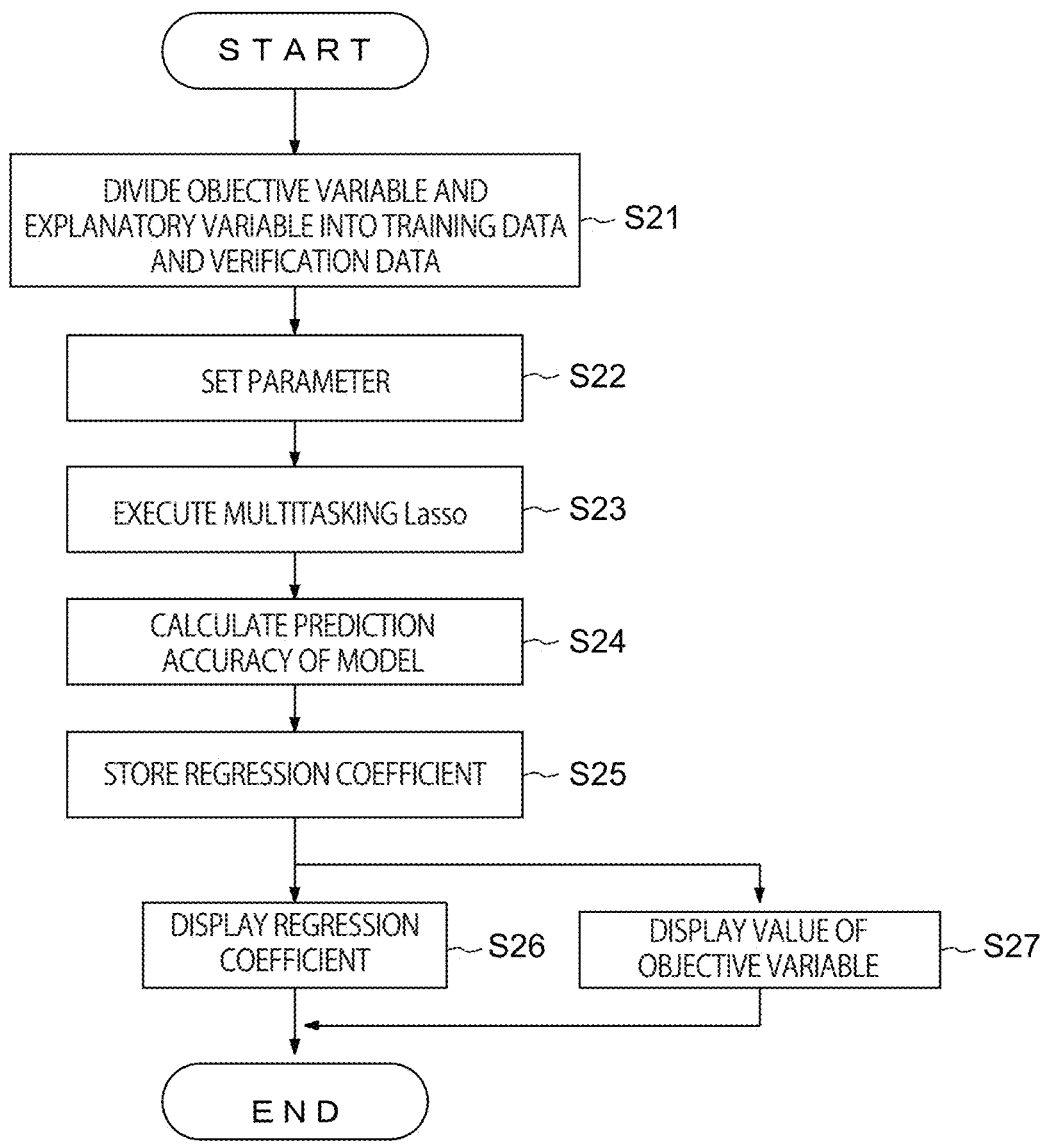
FIG. 10 is a detailed flowchart of processing of steps S17 to S20 in FIG. 3B performed by an influence degree calculation unit.

FIG. 10 is a detailed flowchart of the processing of steps S17 to S20 in FIG. 3B performed by the influence degree calculation unit 5. First, a data set obtained by combining the explanatory variable stored in the explanatory variable storage unit 7 and the objective variable obtained in step S16 is generated, and the data set is divided into training data and verification data (step S21).

Next, in a case where the influence degree calculation unit calculates the influence degree by using, for example, the multitasking Lasso, the influence degree calculation unit 5 sets the parameter of the multitasking Lasso (step S22). The parameter set here relates to the number of divisions of a cross validation, a data pattern at the time of the cross validation, convergence determination of a coordinate descent method, or the like.

Next, the multitasking Lasso is executed by using the training data divided in step S21 (step S23).

Next, the verification data divided in step S21 is given to a model constructed by the multitasking Lasso, and a prediction accuracy of the model is calculated. As a specific index, a residual sum squares ($R^2$), a mean squared error (MSE), a root mean squared error (RMSE), or the like is used.

FIG. 11 is a diagram illustrating an example of input data for the multitasking Lasso. As illustrated in FIG. 11, a data set including an index (identification number), an objective variable Y, and an explanatory variable X is input to the influence degree calculation unit 5. In the example of FIG. 11, the objective variables Y include a defect rate and a class. The class indicates, for example, a type of defect. The defect rate indicates a defect rate of each class. The explanatory variables X include information such as an apparatus name, a manufacturing condition, a processing temperature, and a processing gas pressure for each process. Among the explanatory variables in FIG. 11, the apparatus name and the manufacturing condition of each process are categorical variables including non-numerical data. The processing temperature and the processing gas pressure in each process are continuous variables including numerical data.

The categorical variable in FIG. 11 is converted into the numerical data. FIG. 12 is a diagram illustrating an example of converting the categorical variable into the numerical data. An apparatus A, which is the apparatus name of the process A in FIG. 12, is converted into, for example, 1, and an apparatus B is converted into, for example, 0.

The multitasking Lasso uses the following Formula (2), W is an objective variable using a coefficient W of Formula (1), X is the number of parameters, and B is a regression coefficient. For example, W is represented by a matrix of n rows and m columns, X is represented by a matrix of n rows and p columns, and B is represented by a matrix of p rows and m columns. As illustrated in FIG. 8, in a case where the coefficient W of Formula (1) includes a task 1 and a task 2, the objective variable W of Formula (2) also includes the task 1 and the task 2.

$$W = X \times B \quad (2)$$

More specifically, the multitasking Lasso inputs a coefficient vector wim and an explanatory variable x constituting the objective variable W based on the following Formula (3), and calculates a regression coefficient $\beta_0$ and a regression coefficient vector $\beta$ ($\beta 1, \beta 2, \ldots \beta n$). Formula (3) is a minimization function as described as min. $\lambda$ is a regularization parameter, and m is the number of calculations, $\| \|$ is a norm, and means that a root value or a maximum value of the sum of squares is calculated.

[Formula 1]

$$\min_{\beta_0 \beta} \frac{1}{n} \sum_{m=1}^{M} \sum_{i=1}^{n} (w_{im} - \beta_0^m - x_i^m \beta^m)^2 + \lambda \sum_{j=1}^{p} \|\beta_j\|_2 \quad (3)$$

FIG. 13 is a diagram illustrating an example of output data of the multitasking Lasso. As illustrated in FIG. 13, for each of the tasks w1 and w2 as the objective variable W, the corresponding explanatory variable is output in descending order of a regression coefficient B. In the example of FIG. 13, the objective variable W includes a task 1 as the central defect and a task 2 as the ring-shaped defect. It is indicated that, for the central defect, the possibility that the apparatus A in the process B is a defect factor is the highest, and for the ring-shaped defect, the possibility that the apparatus B in the process E is a defect factor is the highest.

When the processing in step S23 of FIG. 10 ends, next, the analysis accuracy verification unit 21 calculates the prediction accuracy of the model constructed by the multitasking Lasso based on the verification data divided in step S21 (step S24), The prediction accuracy is represented by the calculation result of Formula (3), and the smaller the calculation result of Formula (3), the higher the prediction accuracy, and the calculation result of Formula (3) depends on the regression coefficient $\beta 0$ and the regression coefficient vector $\beta$ ($\beta 1, \beta 2, \ldots, \beta n$). Next, the regression coefficient having the prediction accuracy equal to or higher than a reference value is stored in the influence degree storage unit 13 (step S25).

The influence degree display unit 14 displays the regression coefficient stored in the influence degree storage unit 13 as necessary (step S26), In addition, the objective variable information display unit 15 displays a value of the objective variable stored in the influence degree storage unit 13 as necessary (step S27).

Figures 14A, 14B:
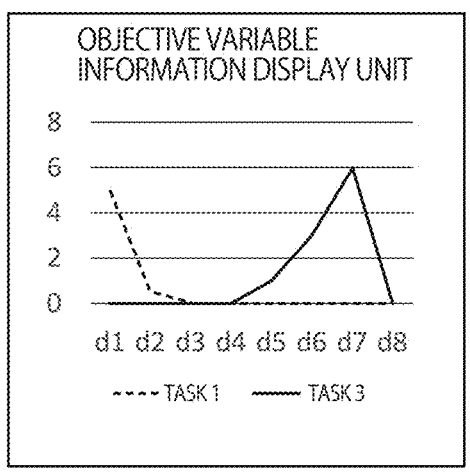
FIG. 14A is a diagram illustrating a screen display example of an influence degree display unit.
FIG. 14B is a diagram illustrating a screen display example of an objective variable information display unit.

FIG. 14A is a diagram illustrating a screen display example of the influence degree display unit 14. In the example of FIG. 14A, the influence degree (regression coefficient) of the task 1 included in the objective variable and the corresponding explanatory variable are displayed in association with each other, and the influence degree (regression coefficient) of a task 3 and the corresponding explanatory variable are displayed in association with each other. In addition, a value is displayed for each index (for example, $R^2$ and MSE) of the influence degree.

FIG. 14B is a diagram illustrating a screen display example of the objective variable information display unit. In the example of FIG. 14B, the values of the task 1 and the task 3 included in the objective variable for each chip are displayed by a polygonal line. In FIG. 14B, a horizontal axis represents the type of the chip, and a vertical axis represents the value of the objective variable.

In the above description, an example has been described in which the information processing apparatus 1 according to the present embodiment is applied to the analysis of manufacturing defect of the semiconductor device, but the information processing apparatus 1 according to the present embodiment can be applied to analysis of various kinds of data. FIG. 15 is a diagram illustrating an example in which the information processing apparatus 1 according to the present embodiment is applied to analysis of a relationship between a nucleotide sequence of a gene and a genetic disease. FIG. 15 illustrates single nucleotide polymorphism (SNP) mutations. In FIG. 15, the mutations of SNP1 to SNP7 are associated with a disease rate for each individual specimen. By inputting the SNP1 to SNP7 of the specimen to be analyzed to the information processing apparatus 1 according to the present embodiment, the disease rate can be accurately predicted.

As described above, in the present embodiment, the number of dimensions of the objective variable is compressed in calculating the influence degree of the multi-dimensional objective variable. As a result, the processing time for calculating the influence degree can be significantly shortened, Since the basis for characterizing the objective variable and the coefficient for weighting the basis can be calculated only by inputting the objective variable to the objective variable dimension compression unit 3, calculation efficiency can be improved. The PCA, clustering, NMF, or the like is used to compress the number of dimensions of the objective variable. In order to compress the number of dimensions of the objective variable, it is necessary to input a parameter such as the number of tasks. However, in the present embodiment, since the user interface unit 12a is provided so that the operator can easily input the parameter, the number of dimensions of the objective variable can be reduced by inputting an optimum parameter.

In addition, since the coefficient obtained by reducing the number of dimensions of the objective variable is input to the influence degree calculation unit 5 as a new objective variable, the influence degree can be calculated simply and accurately, Since the influence degree calculation unit 5 calculates the influence degree by calculation by, for example, a multi-learning method, the influence degree can be accurately calculated in a short processing time.

Second Embodiment

Figure 16:
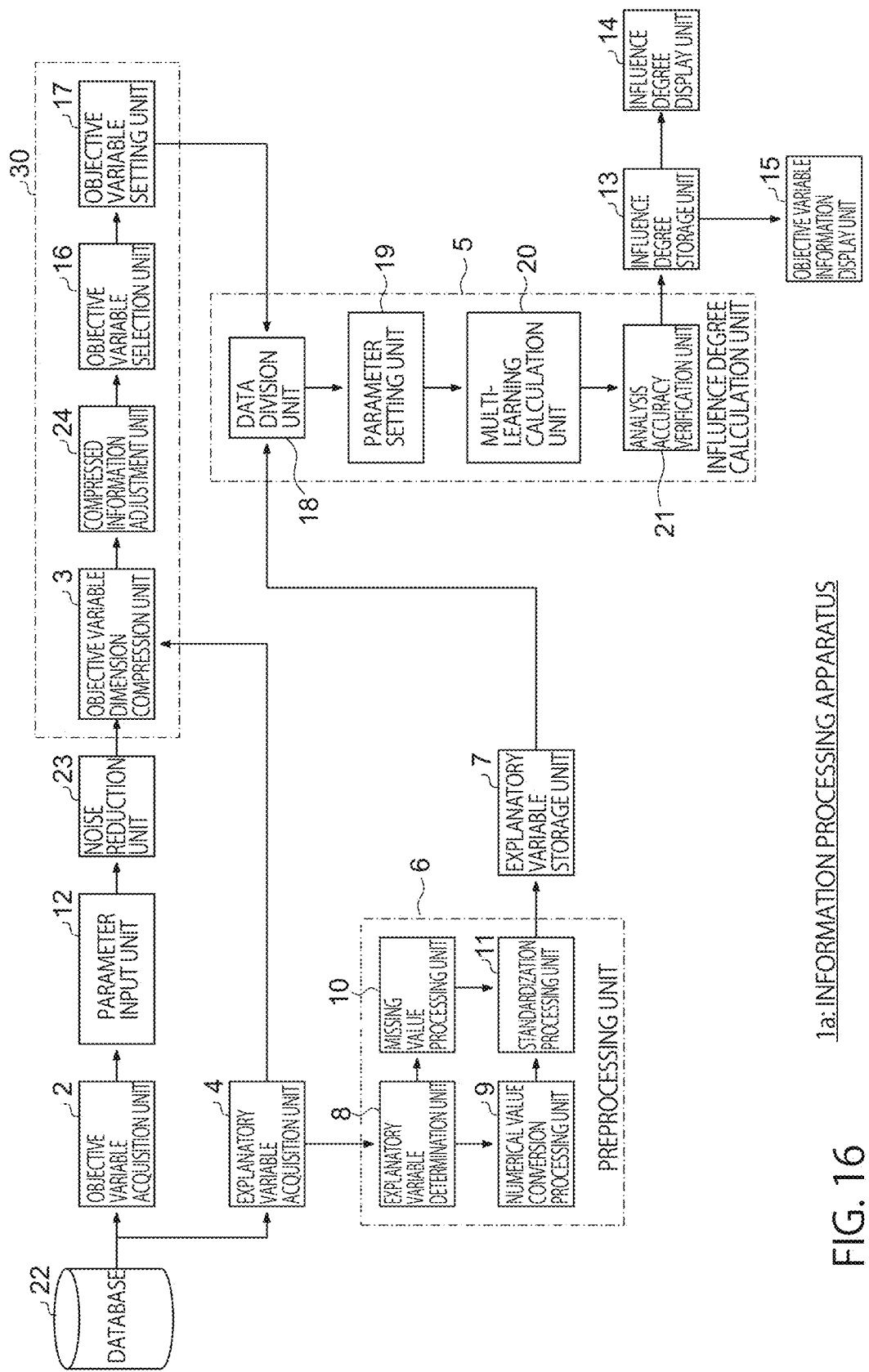
FIG. 16 is a block diagram illustrating a detailed configuration of an information processing apparatus according to a second embodiment.

FIG. 16 is a block diagram illustrating a detailed configuration of an information processing apparatus 1a according to a second embodiment. In FIG. 16, the elements common to FIG. 2 have the same reference numerals. Differences between the first and second embodiments will be mainly described below.

In addition to the configuration of the information processing apparatus 1 shown in FIG. 2, the information processing apparatus 1a shown in FIG. 16 includes at least one of a noise reduction unit 23 and a compressed information adjustment unit 24.

The noise reduction unit 23 removes or converts an outlier included in the objective variable acquired by the objective variable acquisition unit 2. More specifically, the noise reduction unit 23 removes or converts noise included in data to be compressed. Examples of the conversion method include mean interpolation, median interpolation, Non-Local Means, Inverse Distance Weighted (IDW), and Multi-level B-Spline Approximation (MBA).

Figure 17:
FIG. 17 is a diagram illustrating, as numerical values, chip information of each chip formed in four wafers.
Figure 18:
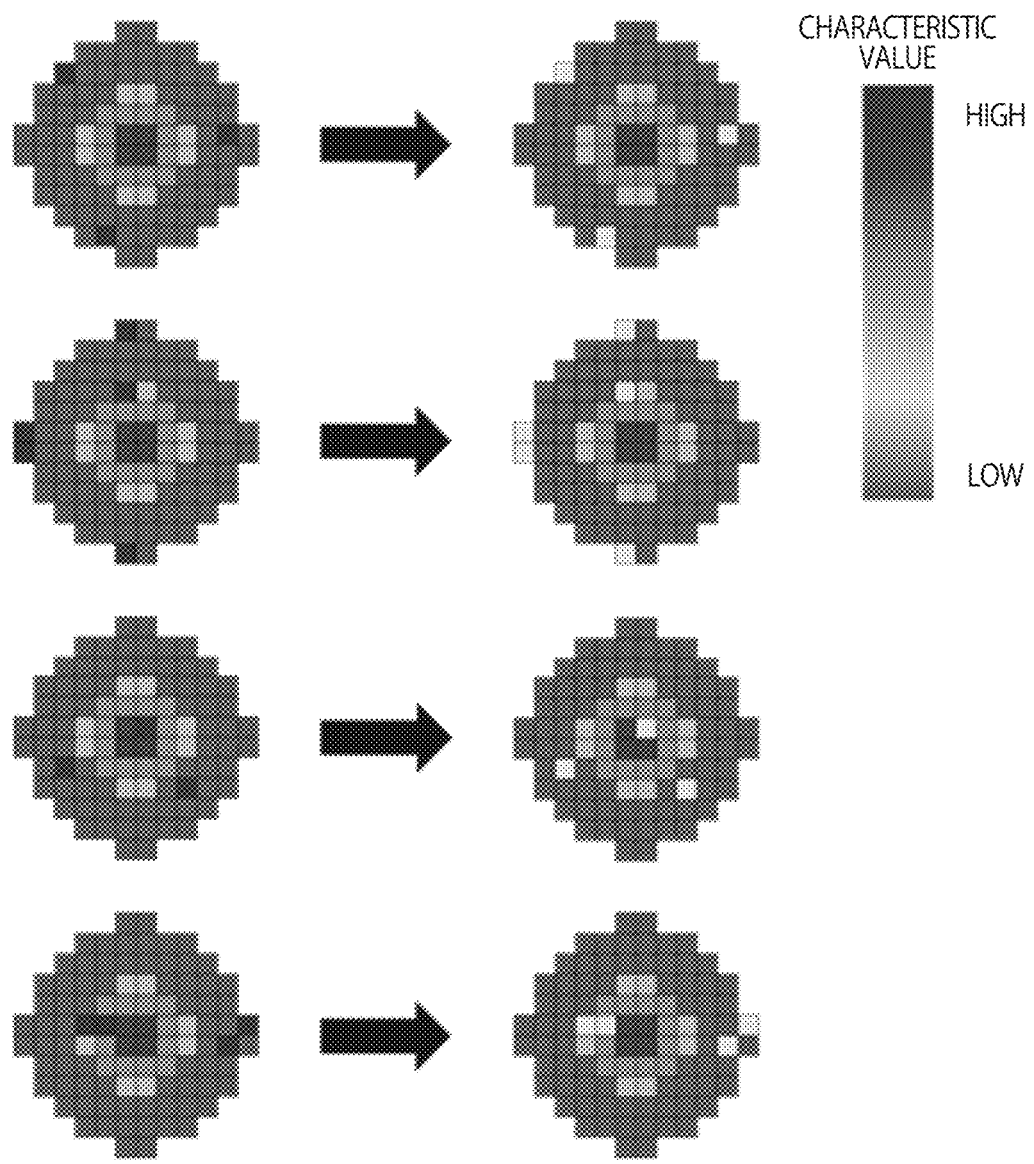
FIG. 18 is a diagram imaging chip information of the four wafers shown in FIG. 17, before and after noise reduction.

FIGS. 17 and 18 are diagrams for explaining a processing operation of the noise reduction unit 23. FIG. 17 shows numerical values representing chip information of chips formed on four wafers 01, 02, 03, and 04. As in FIG. 6, the chip information includes such data as the electrical characteristic value, the numerical data, and the measured data of each chip.

The upper table in FIG. 17 shows chip information before noise reduction, and the lower table shows chip information after noise reduction. In the example of FIG. 17, chip information that is more than 50 is subjected to noise reduction and changed to chip information of less than 50. After the noise reduction, the number of dimensions of the objective variable is compressed. As a result, the number of dimensions may be compressed without being influenced by noise.

FIG. 18 is a diagram visualizing the chip information of the four wafers in FIG. 17 before and after the noise reduction. The left side of FIG. 18 shows images before the noise reduction, and the right side shows images after the noise reduction. In FIG. 18, the difference in value of the chip information (for example, the electrical characteristic value) is shown by the shade of color. Before the noise reduction, there are outliers in some places in the chip information. After the noise reduction, however, the outliers are removed or converted.

The compressed information adjustment unit 24 included in the information processing apparatus 1a shown in FIG. 16 adjusts the value and the number of dimensions of the objective variable, the number of dimensions having been compressed by the objective variable dimension compression unit 3. The compressed information adjustment unit 24 is disposed between the objective variable dimension compression unit 3 and the objective variable selection unit 16. The compressed information adjustment unit 24, together with the objective variable dimension compression unit 3, the objective variable selection unit 16, and the objective variable setting unit 17, constitutes the data compression unit 30.

The compressed information adjustment unit 24 performs an adjustment to determine whether the coefficient W or the basis H is set as the objective variable.

Figure 19:
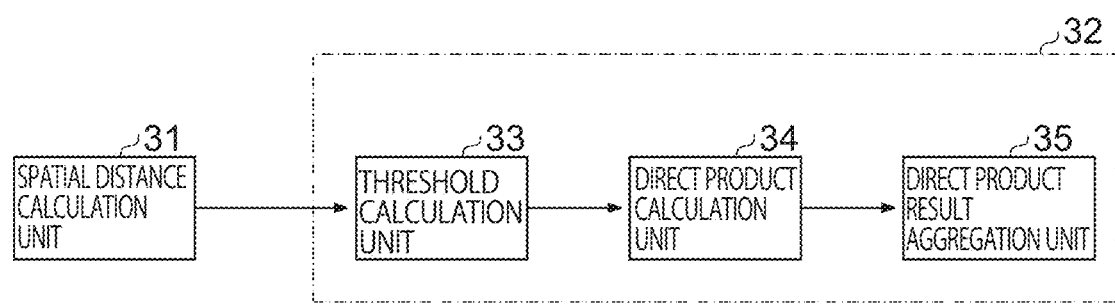
FIG. 19 is a block diagram illustrating an internal configuration of a compressed information adjustment unit.

FIG. 19 is a block diagram illustrating an internal configuration of the compressed information adjustment unit 24 including a spatial distance calculation unit 31 and a basis emphasis unit 32.

The spatial distance calculation unit 31 aggregates a plurality of neighboring bases H, and aggregates a plurality of neighboring coefficients W. Specifically, the spatial distance calculation unit 31 aggregates a coefficient W that has a value close to the value of the coefficient W obtained by the objective variable dimension compression unit 3, and aggregates a basis H that has a value close to the value of the basis H.

Thus, the spatial distance calculation unit 31 performs aggregation so that the coefficient W and the basis H are not over-segmented, Examples of the method for aggregating the coefficient W and the basis H may include a direct aggregation method using, for example, fused lasso, and a method of calculating a median value of vectors in a high-order phase function.

The basis emphasis unit 32 sets the basis H as a target variable, and performs an operation to emphasize the basis H. The basis emphasis unit 32 includes a threshold calculation unit 33, a direct product calculation unit 34, and a direct product result aggregation unit 35.

The threshold calculation unit 33 performs a binary conversion operation to convert the value of the basis H obtained by the NMF represented by Formula (1) described above to 0 or 1, More specifically, the threshold calculation unit 33 calculates statistic values such as a median value, a mean value um, and a standard deviation σm for each task of the basis H, and sets a threshold for a single statistic value or a combination of statistic values. At this time, elements that are greater than the threshold are set to be 1, and others are set to be 0. A threshold obtained by combining statistic values may be set as um+σm.

The direct product calculation unit 34 performs a direct product calculation on data for each task binarized by the threshold calculation unit 33 to form direct product groups. Each direct product group has a combination of 0 and 1, If the number of tasks is m, the number of direct product groups is $2^m$.

The direct product result aggregation unit 35 aggregates the objective variables based on the direct product groups, the objective variables having the number of dimensions compressed by the objective variable dimension compression unit 3.

Figure 20:
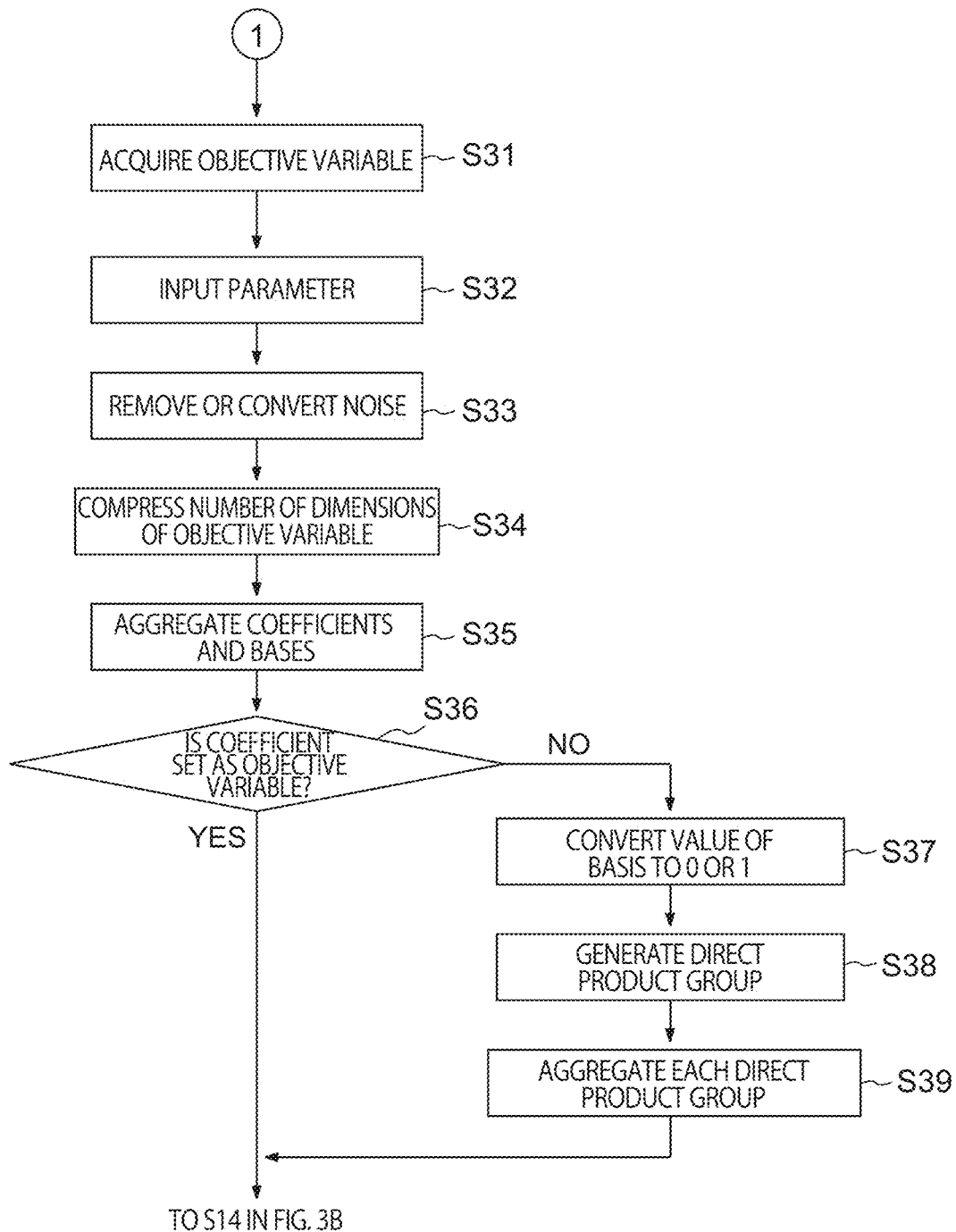
FIG. 20 is a flowchart illustrating a processing operation of an information processing apparatus according to a second embodiment.

FIG. 20 is a flowchart illustrating a processing operation of the information processing apparatus 1a according to the second embodiment. The processing operation shown in FIG. 20 is performed in parallel with the processing steps S1 to S8 shown in FIG. 3A, instead of the processing steps shown in FIG. 3B. The flowchart shown in FIG. 20 includes the processing operations performed by the objective variable dimension compression unit 3, the spatial distance calculation unit 31, and the basis emphasis unit 32. FIGS. 21A, 21B, 21C, and 21D illustrate a specific example, in which the number of dimensions of an objective variable is six, and the spatial distance calculation unit 31 and the basis emphasis unit 32 perform processing operations for two tasks.

Hereinafter, the processing operation of the information processing apparatus 1a according to the second embodiment will be described with reference to FIGS. 20 and 21. First, the objective variable acquisition unit 2 acquires the objective variable from the database 22 (step S31). Next, the parameter input unit 12 inputs a parameter used for the processing of the objective variable dimension compression unit 3 (step S32). Next, the noise reduction unit 23 removes or converts noise included in the acquired objective variable (step S33).

Next, the objective variable dimension compression unit 3 compresses the number of dimensions of the objective variable by using the objective variable acquired in step S31 and the parameter input in step S32 (step S34).

Next, the spatial distance calculation unit 31 generates a coefficient W' by aggregating neighboring coefficients W, and a basis H' by aggregating neighboring bases H (step S35).

Next, it is determined whether the coefficient W' generated by the spatial distance calculation unit 31 is set as the objective variable (step S36). The process in step S36 is a selection process performed by the compressed information adjustment unit 24. This process is called "selection unit process" herein. When NO is determined in step S36, the above-described processing of the basis emphasis unit 32 is performed. Specifically, the basis H is set as the objective variable, and the threshold calculation unit 33 performs a binary conversion to convert the value of the basis H to 0 or 1 (step S37).

FIG. 21A illustrates an example of statistic values calculated by the spatial distance calculation unit 31. As shown in FIG. 21A, the statistic value of each task is calculated for each dimension of the objective variable. Examples of the statistic values shown in FIG. 21A include a median value, a mean value and a standard deviation of each dimension of the basis H calculated for each task. FIG. 21B shows an example of a result of binary conversion of the statistic values shown in FIG. 21A, performed by the threshold calculation unit 33. The result is expressed as 0 or 1. As shown in FIG. 21B, the value for each dimension of the basis H, which is the objective variable, is converted to 0 or 1.

When the processing of step S37 in FIG. 20 ends, the direct product calculation unit 34 calculates a direct product of values 0 or 1 of each task converted by the threshold calculation unit 33 to generate a direct product group of each dimension (step S38). FIG. 21C shows an example of the direct product groups generated for the respective dimensions of the objective variable. As shown in FIG. 21C, four types of direct product groups "00," "10," "01," and "11" are generated.

Figure 21D:
FIG. 21D shows the chip information of each chip on three wafers, and the mean value of the chip information of each direct product group.

When the processing of step S38 in FIG. 20 ends, the direct product result aggregation unit 35 aggregates the values of the respective dimensions of the objective variable to be decomposed for each direct product group generated in step S37 to compute a mean value (step S39), The upper table in FIG. 21D shows the chip information of each chip (dimension) on three wafers, for example. The lower table in FIG. 21D shows the mean value of the chip information of each direct product group.

As described above, as a result of the processing of steps S36 to S38 in FIG. 20, the mean value of the chip information can be calculated for each direct product group, which indicates a combination of defect types.

If it is determined in step S36 in FIG. 20 that the coefficient W' is set as the objective variable, or the processing of step S39 ends, the processing of step S14 and the following steps in FIG. 36 are performed.

Figure 22:
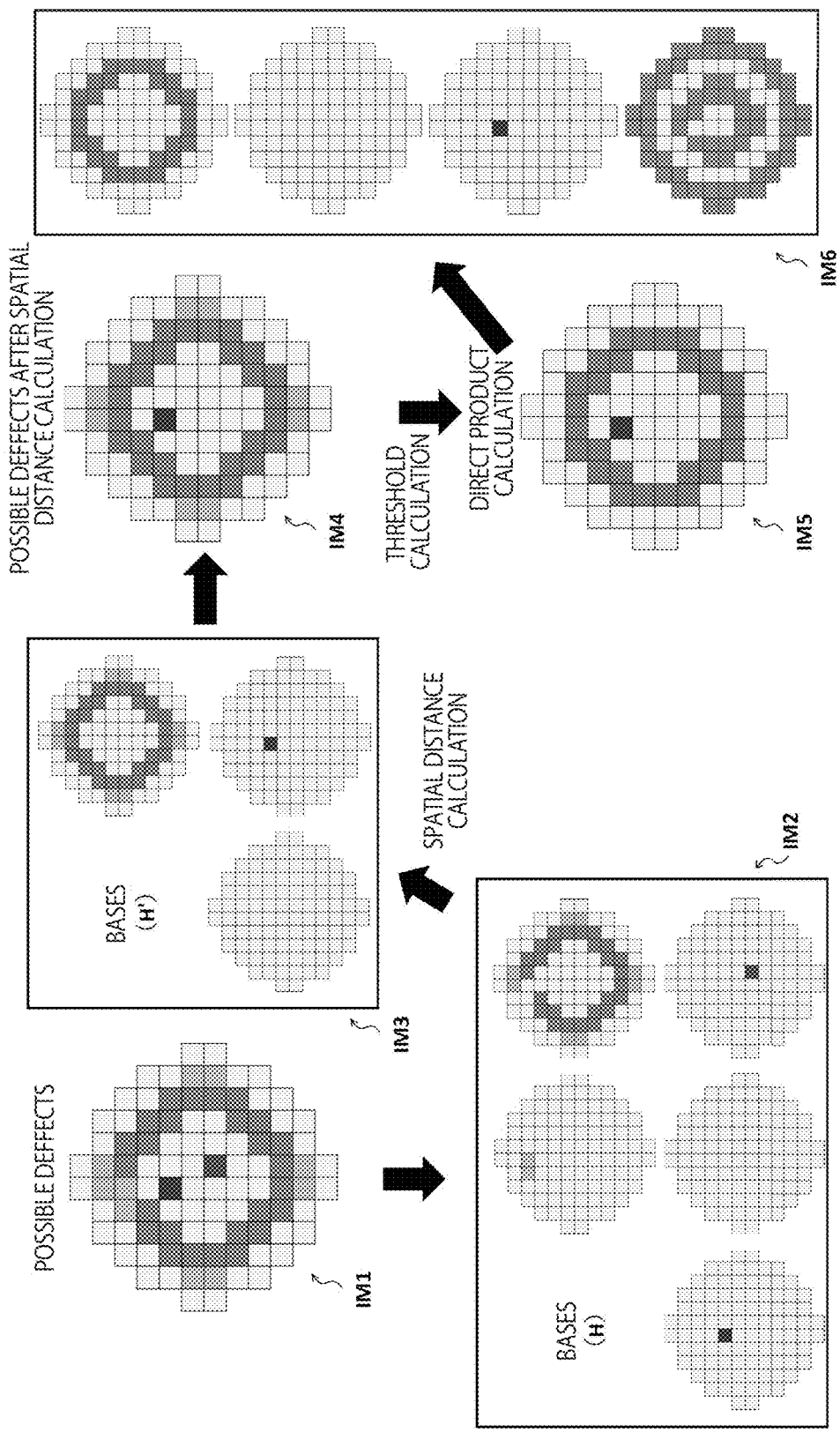
FIG. 22 is a diagram illustrating an example of a processing result of the compressed information adjustment unit 24.

FIG. 22 is a diagram illustrating an example of a processing result of the compressed information adjustment unit 24. In the example shown in FIG. 22, a plurality of bases indicating that a wafer may be defective are extracted. An image IM1 shows that a wafer may be defective. In the image IM1, the wafer has six types of defects. Each defect may have three or more levels of shading.

An image IM2 shows bases obtained by processing the image IM1 by means of the objective variable dimension compression unit 3. An image IM3 shows bases H' obtained by processing the image IM2 by means of the spatial distance calculation unit 31 to aggregate neighboring bases. An image IM4 shows possible defects of the wafer after the processing of the spatial distance calculation unit 31 is performed.

An image IM5 shows that, after the processing is performed by the threshold calculation unit 33, bases that have values exceeding a threshold are extracted. An image IM6 shows bases that are finally obtained by processing the image IM5 by means of the direct product calculation unit 34. The image IM6 shows an example, in which binarized four types of defects are finally extracted.

As described above, in the second embodiment, noise such as an outlier is removed from the acquired obtained objective variable before the dimensions of the objective variable are compressed. As a result, it may be possible to avoid adverse effect of the noise.

In the second embodiment, among coefficients W and bases H obtained by the processing of the objective variable dimension compression unit 3, neighbouring coefficients W are aggregated, and neighboring bases H are aggregated. As a result, the number of coefficients W and the number of bases H may be reduced. This improves the computing efficiency.

Furthermore, in the second embodiment, it is possible to select whether the coefficient W is set as the objective variable or the basis H is set as the objective variable. Therefore, as the necessity arises, not only the coefficient W but also the basis H may be set as objective variables when the influence degree with respect to the objective variable is calculated. If the basis is set as the objective variable, the basis is emphasized. As a result, an important basis may be set as the objective variable, and the number of objective variables may be reduced.

At least a part of the information processing apparatus 1 described in the above-described embodiment may be configured by hardware or software. In a case where the information processing apparatus 1 is configured by software, a program for implementing at least some functions of the information processing apparatus 1 may be stored in a recording medium such as a flexible disk or a CD-ROM, and may be read and executed by a computer. The recording medium is not limited to a removable recording medium such as a magnetic disk or an optical disk, and may be a fixed recording medium such as a hard disk device or a memory.

In addition, a program for implementing at least some functions of the information processing apparatus 1 may be distributed via a communication line (including wireless communication) such as the Internet. Further, the program may be distributed via a wired line or a wireless line such as the Internet or stored in a recording medium in an encrypted, modulated, or compressed state.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing apparatus comprising processing circuitry configured to:
    acquire a multi-dimensional objective variable;
    compress the number of dimensions of the objective variable calculated based on a multiplication result of a plurality of bases characterizing the objective variable and a plurality of coefficients weighting the plurality of bases;
    acquire an explanatory variable;
    select two or more new objective variables from at least one of the plurality of bases and the plurality of coefficients and calculate an influence degree on the two or more new objective variables by performing calculation by a multi-learning method using the two or more new objective variables and the explanatory variable;
    select two or more coefficients to be used as the two or more new objective variables among the plurality of coefficients; and
    set the selected two or more coefficients to the two or more new objective variables.

2. The information processing apparatus according to claim 1,
    wherein the processing circuitry is further configured to perform preprocessing for converting the acquired explanatory variable into a format for analyzing data,
    wherein the explanatory variable after the preprocessing is input to the processing circuitry.

3. The information processing apparatus according to claim 2, wherein the processing circuitry is further configured to:
    store the explanatory variable after the preprocessing;
    determine whether the acquired explanatory variable is a categorical variable or a continuous variable;
    perform numerical value conversion processing of the categorical variable when the acquired explanatory variable is the categorical variable;
    perform processing of complementing a missing value when the acquired explanatory variable is the continuous variable; and
    perform standardization processing of an explanatory variable on which the numerical value conversion processing or the processing of complementing the missing value is performed,
    wherein the processing circuitry is further configured to store the explanatory variable after the standardization processing, and
    wherein the explanatory variable stored in the explanatory variable storage is input to the processing circuitry.

4. The information processing apparatus according to claim 1,
    wherein the processing circuitry is configured to compress the number of dimensions of the objective variable by using a principal component analysis (PCA), a clustering, or a non-negative matrix factorization (NMF).

5. The information processing apparatus according to claim 1,
    wherein the processing circuitry is configured to compress the number of dimensions of the objective variable by using an NMF, and
    the processing circuitry is configured to perform processing of multitasking Lasso or Bayesian optimization by using the two or more coefficients obtained by compressing the number of dimensions of the objective variable using the NMF as the two or more new objective variables, and calculate the influence degree on the two or more new objective variables.

6. An information processing apparatus comprising processing circuitry configured to:
    acquire a multi-dimensional objective variable;
    compress the number of dimensions of the objective variable;
    acquire an explanatory variable;
    set at least one of a basis characterizing the objective variable and a coefficient weighting the basis as a new objective variable and calculate an influence degree on the new objective variable by using the explanatory variable;
    verify an accuracy of the influence degree;
    divide a data set including the new objective variable and the explanatory variable into training data and verification data,
    wherein the processing circuitry is configured to calculate the influence degree by using the training data, and
    the processing circuitry is configured to verify the accuracy of the influence degree by using the verification data.

7. The information processing apparatus according to claim 1,
    wherein the processing circuitry is further configured to display the influence degree.

8. The information processing apparatus according to claim 1,
    wherein the processing circuitry is further configured to display information on the objective variable of the compressed number of dimensions.

9. The information processing apparatus according to claim 7,
    wherein the processing circuitry is configured to display each of the explanatory variables and the corresponding influence degree for each of the two or more new objective variables.

10. The information processing apparatus according to claim 9, wherein the processing circuitry is configured to calculate regression coefficients as the influence degree by using multitasking Lasso, and the processing circuitry is configured to rearrange and display each of the explanatory variables in order of values of the regression coefficients.

11. The information processing apparatus according to claim 9, wherein the explanatory variable includes information of at least one of a plurality of manufacturing apparatuses and a plurality of manufacturing processes, and the processing circuitry is configured to rearrange and display information of at least one of the plurality of manufacturing apparatuses and the plurality of manufacturing processes in order of values of the regression coefficients.

12. The information processing apparatus according to claim 1, wherein the acquired multi-dimensional objective variable includes at least one of an electrical characteristic value, a numerical value, and a measured value.

13. An information processing apparatus comprising processing circuitry configured to:

acquire a multi-dimensional objective variable;

compress the number of dimensions of the objective variable;

acquire an explanatory variable;

set at least one of a basis characterizing the objective variable and a coefficient weighting the basis as a new objective variable and calculate an influence degree on the new objective variable by using the explanatory variable;

remove or convert an outlier included in the acquired objective variable, wherein the processing circuitry is configured to compress the number of dimensions of the objective variable for which the outlier is removed or converted.

14. An information processing apparatus comprising processing circuitry configured to:

acquire a multi-dimensional objective variable;

compress the number of dimensions of the objective variable;

acquire an explanatory variable;

set at least one of a basis characterizing the objective variable and a coefficient weighting the basis as a new objective variable and calculate an influence degree on the new objective variable by using the explanatory variable; and adjust a value and the number of dimensions of the objective variable for which the number of dimensions is compressed, wherein the processing circuitry is further configured to aggregate a plurality of neighboring bases, and to aggregate a plurality of neighboring coefficients.

15. The information processing apparatus according to claim 14, wherein the processing circuitry is further configured to:

select the basis or the coefficient obtained by the aggregating of the plurality of neighboring bases and the plurality of neighboring coefficients; and emphasize the basis when the selector selects the basis, and wherein the processing circuitry is configured to calculate the influence degree based on the emphasized basis.

16. The information processing apparatus according to claim 15, wherein the processing circuitry is further configured to:

binarize a value of the basis for each task depending on whether the value of the basis exceeds a threshold or not, when the basis is selected;

perform direct product calculation of data for each task, for which the value is binarized, in order to generate a direct product group; and aggregate the objective variable, for which the number of dimensions is compressed based on the direct product group.

17. An information processing method comprising:

compressing the number of dimensions of the objective variable calculated based on a multiplication result of a plurality of bases characterizing the objective variable and a plurality of coefficients weighting the plurality of bases;

acquiring an explanatory variable;

selecting two or more new objective variables from at least one of the plurality of bases and the plurality of coefficients, and calculating an influence degree on the two or more new objective variables by performing calculation by a multi-learning method using the two or more new objective variables and the explanatory variable;

selecting two or more coefficients to be used as the two or more new objective variables among the plurality of coefficients; and setting the selected two or more coefficients to the two or more new objective variables.

18. A non-transitory recording medium that records a computer-readable program to execute:

compressing the number of dimensions of the objective variable calculated based on a multiplication result of a plurality of bases characterizing the objective variable and a plurality of coefficients weighting the plurality of bases;

acquiring an explanatory variable;

selecting two or more new objective variables from at least one of the plurality of bases and the plurality of coefficients, and calculating an influence degree on the two or more new objective variables by performing calculation by a multi-learning method using the two or more new objective variables and the explanatory variable;

selecting two or more coefficients to be used as the two or more new objective variables among the plurality of coefficients; and setting the selected two or more coefficients to the two or more new objective variable.

19. The information processing apparatus according to claim 5, wherein the processing circuitry is further configured to input a parameter that designates the number of dimensions for compressing the objective variable.

20. The information processing apparatus according to claim 19, wherein the processing circuitry comprises a user interface having a function of re-inputting the parameter while displaying a compression result of the number of dimensions of the objective variable.

21. The information processing method according to claim 17, wherein the number of dimensions of the objective variable is compressed by using an NMF, and processing of multitasking Lasso or Bayesian optimization is performed by using the two or more coefficients obtained by compressing the number of dimensions of the objective variable using the NMF as the two or more new objective variables, and the influence degree on the two or more new objective variables is calculated.

22. The information processing method according to claim 21, further comprising:
inputting a parameter that designates the number of dimensions for compressing the objective variable.

23. The information processing method according to claim 22, further comprising:
re-inputting the parameter while displaying a compression result of the number of dimensions of the objective variable.

24. The non-transitory recording medium according to claim 18,
wherein the number of dimensions of the objective variable is compressed by using an NMF, and
processing of multitasking Lasso or Bayesian optimization is performed by using the two or more coefficients obtained by compressing the number of dimensions of the objective variable using the NMF as the two or more new objective variables, and the influence degree on the two or more new objective variables is calculated.

25. The non-transitory recording medium according to claim 24,
wherein the computer-readable program further executes inputting a parameter that designates the number of dimensions for compressing the objective variable.

26. The non-transitory recording medium according to claim 25,
wherein the computer-readable program further executes re-inputting the parameter while displaying a compression result of the number of dimensions of the objective variable.

27. An information processing apparatus comprising processing circuitry configured to:
acquire a multi-dimensional objective variable;
compress the number of dimensions of the objective variable calculated based on a multiplication result of a plurality of bases characterizing the objective variable and a plurality of coefficients weighting the plurality of bases;
acquire an explanatory variable;
select two or more new objective variables from at least one of the plurality of bases and the plurality of coefficients and calculate an influence degree on the two or more new objective variables by performing calculation by a multi-learning method using the two or more new objective variables and the explanatory variable;
select two or more coefficients to be used as the two or more new objective variables among the plurality of coefficients;
set the selected two or more coefficients to the two or more new objective variables;
input a parameter that designates the number of dimensions for compressing the objective variable,
wherein the processing circuitry is configured to compress the number of dimensions of the objective variable by using an NMF, and
the processing circuitry is configured to perform processing of multitasking Lasso or Bayesian optimization by using the two or more coefficients obtained by compressing the number of dimensions of the objective variable using the NMF as the two or more new objective variables, and calculate the influence degree on the two or more new objective variables.

* * * * *